United States Patent
Grandgirard et al.

(10) Patent No.: US 8,881,459 B2
(45) Date of Patent: Nov. 11, 2014

(54) DEVICE FOR FIXING A PIVOT-OPENING GLAZING, GLAZING AND METHOD OF MANUFACTURING THE GLAZING

(75) Inventors: Bastien Grandgirard, Marqueglise (FR); Nicolas Coutellier, Compiegne (FR); Gerard Huchet, Autreches (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 14/005,111

(22) PCT Filed: Mar. 13, 2012

(86) PCT No.: PCT/FR2012/050521
§ 371 (c)(1),
(2), (4) Date: Oct. 24, 2013

(87) PCT Pub. No.: WO2012/123674
PCT Pub. Date: Sep. 20, 2012

(65) Prior Publication Data
US 2014/0041308 A1 Feb. 13, 2014

(30) Foreign Application Priority Data
Mar. 14, 2011 (FR) .................................. 11 52030

(51) Int. Cl.
*E05D 7/00* (2006.01)
(52) U.S. Cl.
USPC ................................................ 49/397; 49/147
(58) Field of Classification Search
USPC ............... 49/147, 381, 397, 399; 296/146.16; 16/225
See application file for complete search history.

(56) References Cited

U.S. PATENT DOCUMENTS

| 1,963,941 | A | * | 6/1934 | Duffy | 49/147 |
| 2,586,525 | A | * | 2/1952 | Edwards et al. | 49/147 |
| 3,123,867 | A | * | 3/1964 | Combs | 49/21 |
| 4,363,191 | A | * | 12/1982 | Morgan | 49/381 |
| 4,723,809 | A | * | 2/1988 | Kida et al. | 296/96.21 |

(Continued)

FOREIGN PATENT DOCUMENTS

| CA | 2 120 893 | 10/1995 |
| DE | 39 25 804 | 8/1990 |
| DE | 103 60 436 | 7/2004 |
| EP | 0 289 156 | 11/1988 |

OTHER PUBLICATIONS

International Search Report Issued Jun. 13, 2012 in PCT/FR12/050521 Filed Mar. 13, 2012.

*Primary Examiner* — Jerry Redman
(74) *Attorney, Agent, or Firm* — Oblon, Spivak, McClelland, Maier & Neustadt, L.L.P.

(57) ABSTRACT

A device for fixing a glazed element into an opening for the glazed element to be pivotable with respect to the opening. The device includes at least one projecting element including an axis for fixing the device to an upright of the opening, and at least one baseplate including interior and exterior faces facing a surface of the glazed element. The baseplate is at least partially integrated into a portion of elastic material adhering at least to the interior face. The projecting element rigidly fixes the projecting element to the upright of the opening so that the orientation of the axis with respect to the upright remains unchanged during opening or closing movement of the glazed element and so that during the opening movement, at least part of the portion of elastic material is squashed between the baseplate and the upright or between the baseplate and the glazed element.

10 Claims, 3 Drawing Sheets

(56) References Cited

U.S. PATENT DOCUMENTS

| | | | |
|---|---|---|---|
| 4,777,699 A | 10/1988 | Hill et al. | |
| 5,457,913 A * | 10/1995 | Gold | 49/381 |
| 5,467,557 A * | 11/1995 | Jones | 49/171 |
| 5,560,153 A * | 10/1996 | Gold | 49/381 |
| 5,635,281 A * | 6/1997 | Agrawal | 428/192 |
| 5,752,342 A * | 5/1998 | Kreye | 49/501 |
| 6,123,383 A * | 9/2000 | Doerflinger et al. | 296/146.16 |
| 6,412,225 B1 * | 7/2002 | McManus | 49/381 |
| 7,024,822 B2 * | 4/2006 | Scheer et al. | 49/397 |
| 7,076,919 B2 * | 7/2006 | Katakura et al. | 49/397 |
| 8,235,452 B2 * | 8/2012 | Repp et al. | 296/146.16 |
| 2003/0024183 A1 | 2/2003 | Burnside et al. | |
| 2004/0139662 A1 * | 7/2004 | Mizusawa et al. | 49/506 |
| 2004/0245803 A1 | 12/2004 | Katakura et al. | |
| 2005/0121942 A1 * | 6/2005 | Repp et al. | 296/146.15 |
| 2006/0225361 A1 * | 10/2006 | Scheer et al. | 49/397 |
| 2008/0196816 A1 * | 8/2008 | Lewno | 156/99 |
| 2009/0277095 A1 * | 11/2009 | Honda et al. | 49/475.1 |
| 2011/0258931 A1 * | 10/2011 | Gao et al. | 49/28 |

* cited by examiner

DEVICE FOR FIXING A PIVOT-OPENING GLAZING, GLAZING AND METHOD OF MANUFACTURING THE GLAZING

BACKGROUND OF THE INVENTION

The present invention relates to a device for fixing a pivot-opening glazing, notably glazing used on a vehicle. The present invention also relates to glazing using such a fixing device.

Figure 1:
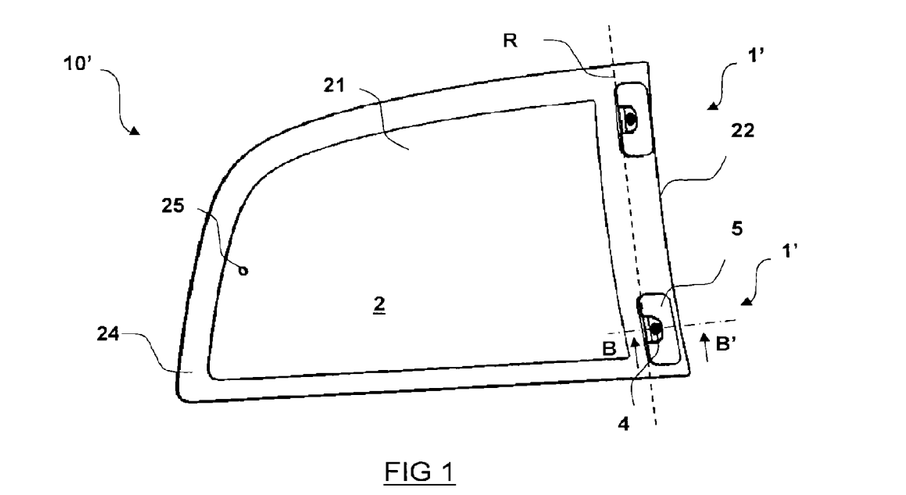
FIG. 1 illustrates a view of the interior face of a vehicle glazing comprising two fixing devices of the prior art for fixing a glazed element.
Figure 2:
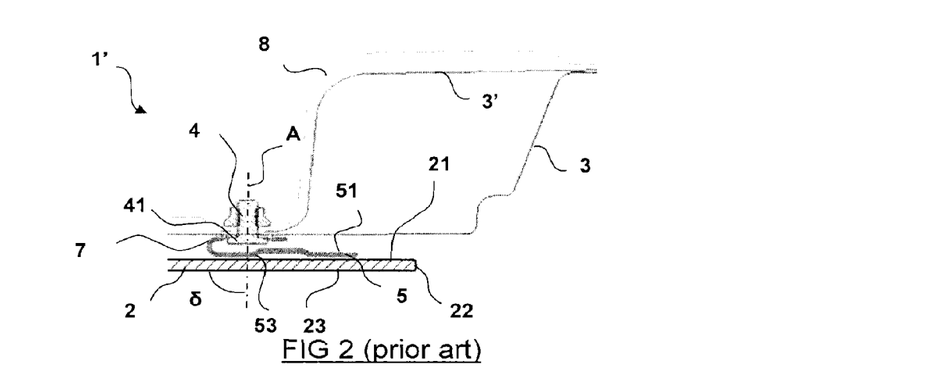
FIG. 2 is a view in section on BB' of FIG. 1, also partially showing the opening with respect to which the glazing can move, the glazing being in a closed position.
Figure 3:
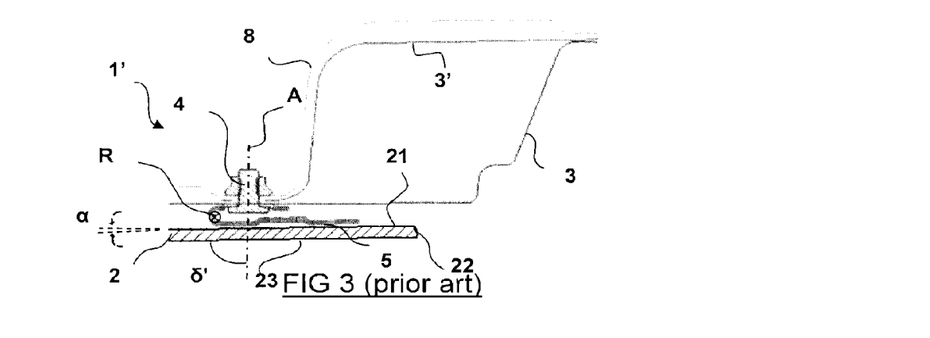
FIG. 3 is a view in section on BB' of FIG. 1, also partially showing the opening with respect to which the glazing can move, the glazing being open by an angle α.

Already known from the prior art is a fixing device 1' illustrated in FIGS. 1 to 3, for fixing a glazed element 2 into an opening so that said glazed element 2 can be pivoted with respect to this opening about an axis of rotation R through a small angle of opening α, which means an angle of between >0°≤10°. This known fixing device 1' comprises:
- on the one hand, at least one projecting element 4 having an axis A for fixing the fixing device 1' to an upright 3 of said opening, and
- on the other hand, a baseplate 5 having an interior face 51 and an exterior face 53 which is bonded against an interior surface 21 of said glazed element 2. The adhesive used is a polyurethane adhesive.

In this device, the projecting element 4 is a rigid fixing means for rigidly fixing the projecting element to the upright 3 of the opening so that the orientation of the axis A of the projecting element with respect to the upright 3 is unchanged during the opening or closing movement of said glazed element 2.

The "opening" function is afforded by the device thanks to the fact that the baseplate 5 is in the shape of a U which is squashed by a few degrees when the legs of the U move closer together, allowing the glazing to be opened through a few tens of millimeters at the opposite end to the fixing device 1'.

The fixing device 1' is made of metal alloy (non-stainless steel) and it is essential to perform a cataphoresis treatment on the non-stainless steel both to protect it from corrosion and to allow it to adhere to the glazed element. This treatment is also required when the fixing device is made of a stainless steel in order to allow it to adhere to the glazed element. This treatment entails an additional operation in the manufacturing process and may be the source of defects which can cause poor adhesion to the interior surface 21 and may even go so far as to cause the glazing to fall off.

Moreover, the U shape entails an operation of bending the sheet metal and this, in addition to the process complications, add an even greater source of uncertainty as to the positioning of the fixing device in the frame of reference of the finished component.

Also known in the prior art, from international patent application No. WO 97/005355 is a fixing device for fixing a glazed element into an opening in order for said glazed element to be able to be pivoted with respect to this opening about an axis of rotation R through a small angle of opening α, said device comprising:
- on the one hand, at least one projecting element having an axis for fixing the device to an upright of said opening, and
- on the other hand, at least one baseplate having an interior face and an exterior face which is situated against an interior surface of said glazed element and said baseplate being integrated into a portion of elastic material adhering at least to said interior face of said glazed element.

In that device, the projecting element is a mobile fixing means which is able to move inside a fixed cavity so that the orientation of the axis of the projecting element with respect to the upright changes during the opening or closing movement of the glazed element.

Thus, in that device, the whole of the elastic material that integrates the baseplate of the projecting element, and the whole of the projecting element are firmly fixed to the glazed element: they very closely follow the glazed element in its opening or closing movements with respect to the opening.

That device is not sufficiently reliable because the collaboration between the mobile projecting element and the fixed cavity causes, through use, premature wear and there is a substantial risk that the projecting element will thereafter no longer be sufficiently well retained by the cavity, the situation potentially being so bad as to cause the glazing to fall off.

Also known from the prior art, from patent application DE 103 60 436 is a fixing device for fixing a glazed element of which a portion of elastic material integrates a single baseplate and this baseplate is fixed elastically to the projecting elements by elastic tabs. These tabs are protected on just part of one side by the portion of elastic material. The part that does the mechanical work, the part which is the most highly stressed and therefore the weakest, is not protected.

Also known from the prior art, from patent application DE 39 25 804 is a fixing device for fixing a glazed element of which the portion of elastic material does not integrate the baseplate but is merely interposed and sandwiched between the baseplate and the glazed element.

In this device, the baseplate is thus fixed rigidly to the projecting element so that its orientation with respect to this projecting element remains unchanged during the opening or closing movement of the glazed element. Because only the portion of elastic material is involved in the opening and closing movement, this fixing device presents problems over time because it is difficult to guarantee that the material will maintain the same elastic properties five years, ten years or more, after it has been installed.

Likewise, in patent application EP 289 156 the elasticity of the fixing device for fixing is controlled only by the elastic material.

SUMMARY OF THE INVENTION

It is an object of the present invention to address the disadvantages of the prior art by proposing a device for fixing pivotable glazing that allows the glazing to be fixed reliably into the opening while at the same time allowing a great many opening and closing movements without the risk of the glazing falling off.

Moreover, the present invention intends to provide a method which is easier to implement and more reliable for fixing the fixing device to the glazed element.

The present invention thus relies on a solution in which one (or more) baseplate of the fixing device is (or are) fully integrated into a portion of elastic material by the molding of this elastic material over a glazed element (technology known as "encapsulation") so that this elastic material contributes firstly to the attachment of the projecting element to the glazed element and secondly to the elasticity required to allow the glazing to be opened through a small angle with respect to the opening.

Thus, for one glazing and for one glazing to another in the same production run, firstly, the fixing of each fixing device by the encapsulate (the elastic material applied using the encapsulation technique) is sure and reliable, but also, the positioning of each fixing device with respect to the glazed element and from one glazed element to another in the same production run is precise, easy and quick because it is carried out inside the encapsulation mold.

Furthermore, the elastic material protects the baseplate, which itself contributes to the required elasticity, from external attack, and particularly from water and salt; the part that does the mechanical work is integrated into the portion of elastic material and the elastic system is thus insensitive to external chemical conditions.

The mechanical connection between the glazed element and the projecting element is improved: the force required to succeed in breaking the connection between the two is higher than was the case in the prior art.

Furthermore, selecting the elasticity of the elastic material provides control over the deformation of this material during the opening and closing movements and provides control over the degree of rotation possible as a function of the span of the glazed element.

In fact, if for the same overall shape of glazing (same width, same positioning of the fixing devices with respect to the opening) there are several possible lengths, for example for several different versions of the same type of vehicle (for example a short version for a five-seater and a longer version for a seven-seater), it then becomes possible to manage the fact that the larger glazed element has to open through a smaller angle than the smaller glazed element, simply by selecting a more rigid elastic material for the larger glazed element.

However, it is also possible to keep the same material for the smaller glazed element and the larger glazed element. The larger glazed element will then be easier to open than the smaller glazed element.

Thus, according to the invention, the device for fixing a glazed element into an opening in order for said glazed element to be able to be pivoted with respect to this opening about an axis of rotation through an angle of opening α, comprises, on the one hand, at least one projecting element having an axis for fixing the device to an upright of said opening, and, on the other hand, at least one baseplate having an interior face and an exterior face which is situated facing a surface of said glazed element and said baseplate being at least partially, or even fully, integrated into a portion of elastic material adhering at least to said interior face of said glazed element.

This device is notable in that said projecting element is a rigid fixing means for rigidly fixing the projecting element to the upright of said opening so that the orientation of the axis with respect to the upright remains unchanged during the opening or closing movement of said glazed element and so that during the opening movement of said glazed element, at least one, if not several, part(s) of said portion of elastic material is (are) squashed between said baseplate and said upright or even also between said baseplate and said glazed element.

The projecting element and the baseplate are connected/attached to one another.

The baseplate is not bonded to the glazed element because it is desired for the elastic material interposed between the baseplate and the glazed element to be able to become squashed as the glazed element is opened and to relax as the glazed element is closed.

The surface of said glazed element facing which the exterior face of the baseplate is positioned is preferably an interior face of said glazed element.

The baseplate is fixed elastically to said projecting element so that its orientation with respect to said projecting element is changed during the opening or closing movement of said glazed element.

In this alternative form, the device preferably comprises a bent connecting part mechanically connecting said projecting element to said baseplate; the bent connecting part forming a bend preferably of between 30° and 180°.

In a specific alternative form, the portion of elastic material adheres only to said interior face of said glazed element; thus, the peripheral edge face of the glazing can be positioned very close to the bodywork, without there being any need to provide any additional seal; the visible space between the peripheral edge face of the glazing and the adjacent bodywork may thus be smaller than 5 mm, giving an appearance of continuity between the glazing and the bodywork.

In all these alternative forms, said projecting element may be a nut having a threaded part and a head which is welded to said baseplate or formed as an integral part of said baseplate or that passes through said baseplate, said head preferably being at least partially, or even fully, integrated into said portion of elastic material.

In one particular alternative form, said baseplate comprises at least one hole opening onto its interior face and onto its exterior face and filled with the material of said portion of elastic material.

In a very particular alternative form, said baseplate comprises at least one anchor tab, and notably four anchor tabs, positioned in said portion of elastic material.

For preference, said baseplate, particularly when it is made of metal or metal alloy, is not in contact with the glazed element at all, the reason for this being to limit any risk of breakage of this element under the effect of a rubbing of the baseplate during opening and closing movements.

The present invention also relates to a glazing comprising a glazed element and at least one, and preferably two, device(s) according to the invention for fixing the glazed element into an opening.

The present invention also relates to a method of manufacturing a glazing comprising a glazed element and at least one device according to the invention for fixing the glazed element into an opening, said device comprising a baseplate which is at least partially, or even fully, overmolded in a portion of elastic material that adheres at least to said interior face of said glazed element.

The present invention further relates to the use of a device for fixing a glazed element into an opening according to the invention, said device comprising, on the one hand, at least one projecting element having an axis A for fixing the device to an upright of said opening, and, on the other hand, at least one baseplate having an interior face and an exterior face which is situated facing a surface of said glazed element, and said baseplate being at least partially, or even fully, integrated into a portion of elastic material adhering at least to said interior face of said glazed element.

According to this use, in order for said glazed element to be pivotable with respect to this opening about an axis of rotation R through an angle of opening α, said projecting element is a rigid fixing means for rigidly fixing the projecting element to the upright of said opening so that the orientation of the axis with respect to the upright remains unchanged during the opening or closing movement of said glazed element and so that during the opening movement of said glazed element, at least one, if not several, part(s) of said portion of elastic material is (are) squashed between said baseplate and said upright or even also between said baseplate and said glazed element, said baseplate being fixed elastically to said projecting element so that its orientation with respect to said projecting element is changed during the opening or closing movement of said glazed element.

The present invention makes it possible to achieve a very reliable connection between the glazed element and the device(s) that fix this element to the opening.

Embedding the baseplate in the portion of elastic material makes it possible to increase the pull-out strength of the baseplate (and therefore of the projecting element) with respect to the glazed element while at the same time protecting the part that does the mechanical work from external attack.

It is no longer essential to use a metal alloy for the fixing device(s) and it is no longer essential to provide a cataphoresis treatment.

It is expensive to design an encapsulation mold for encapsulating only small components such as the portions of plastic material according to the invention; however, this disadvantage is very much compensated by the fact that the glazing can be handled as soon as it leaves the encapsulation mold without the risk of damaging or altering the appearance or properties of the connection between the fixing device(s) and the glazed element.

Moreover, the invention is particularly useful when the glazed element is curved, or evenly highly curved. Indeed in such instances it may be difficult for the fixing devices to be positioned correctly by hand. In the context of the invention, thanks to the use of the mold, the fixing devices are positioned in the mold prior to encapsulation very precisely with respect to the glazed element and the fixing devices are therefore positioned very precisely with respect to the glazed element after encapsulation.

BRIEF DESCRIPTION OF THE DRAWINGS

A number of embodiments of the present invention will be described hereinbelow by way of nonlimiting examples with reference to the attached drawings in which.

PREFERRED EMBODIMENTS

In these figures, the various elements have not been drawn exactly to scale but from one figure to a similar figure the proportions used are the same, and background elements have generally not been depicted, in order to make the figures easier to understand.

FIGS. 1 to 3 illustrate the embodiment of a vehicle glazing 10' of the prior art, comprising a glazed element 2 and two fixing devices 1' which are both identical, for fixing the glazed element 2 into an opening (not visible in FIG. 1) so that this glazed element 2 can be pivoted with respect to this opening about an axis of rotation R through a small angle of opening α, which means to say one of between $>0°$ and $\leq 10°$, for example 5° or 7°.

The glazing 10' is intended to close an opening that separates a space inside the vehicle from a space outside the vehicle. The glazed element 2 thus has an interior face 21, intended to face toward the interior space, an exterior face 23 intended to face toward the exterior space and a peripheral edge face 22.

Thus, when reference is made to the notions of "interior" and "exterior" in the present document, this is always with reference to this idea.

The glazed element may be monolithic, which means made of a single sheet of material, or may be composite, which means made up of several sheets of material between which is inserted at least one layer of adhesive material in the case of laminated glazings. The sheet(s) of material may be mineral, notably glass, or organic, notably plastic.

In the case of vehicle glazing, the glazing generally has, at least partially at its periphery, all around the edge of the interior face 21, a decorative band 24. This decorative band is generally the result of an application of enamel, performed on the interior face of the glazed element when it is monolithic or on an interlayer face of the glazing in the case of composite glazings, but it could equally be the result of a partial and/or peripheral coloration of one sheet of material used, notably of a sheet made of organic material.

When the glazed element is made of organic material, it has been manufactured prior to the implementation of the invention by molding the material of which the glazed element is made in a molding device comprising a mold having at least one fixed mold part and one moving mold part which is able to move with respect to the fixed mold part, said mold parts collaborating while the mold is in the closed state, during the molding step, to form a molding cavity which in cross section has the cross-sectional shape of the glazed element. Often the glazed element made of organic material is not flat but curved.

When the glazed element is made of a mineral material, it has been manufactured prior to the implementation of the invention by melting mineral material into a flat sheet and then by cutting out this sheet and possibly bending and/or toughening this sheet.

For information, the mass-production of a glazed element made of organic material is more expensive than the production of a glazed element made of a mineral material and the first method of manufacture is generally chosen when the shape of the glazed element is so complicated that it cannot be produced by bending a glazed element made of a mineral material.

When the glazed element is a composite glazed element, it has been manufactured according to the well known technique for the manufacture of multiple glazing or laminated glazing, possibly curved.

In FIG. 1, the glazed element 2 is a monolithic glazing. Here this is an openable rear side window of a motor vehicle (a rear quarter light that can be opened slightly).

FIG. 2 illustrates the fixing device 1' in section on BB' of FIG. 1 when the glazed element is in the closed position, and FIG. 3 illustrates the fixing device 1' viewed in section on BB' of FIG. 1 when the glazed element is in the open position at an angle of opening α. α represents the maximum angle of opening; the glazed element 2 cannot be pivoted beyond this angle with respect to the opening because of the presence of an opening-blocking system, not illustrated, collaborating with a hole 25 that passes through the glazed element 2.

Each device 1' comprises, as visible in FIG. 2:
- on the one hand, at least one projecting element 4 having an axis A for fixing the device 1 to an upright 3 of said opening, and
- on the other hand, at least one baseplate 5 having an interior face 51 and an exterior face 53 which is situated facing the interior surface 21 of the glazed element 2.

The projecting element 4 here is a nut having a threaded part 40 and a head 41 which is wider than the threaded part.

The projecting element and the baseplate are connected/attached to one another. For that, the fixing device 1' comprises a connecting part 7 bent at 180°, mechanically connecting the projecting element 4 to the baseplate 5, the end of the connecting part 7 being pierced to retain the head 41 of the projecting element 4.

The baseplate 5 has been bonded using a polyurethane adhesive to the interior face 21 of the glazed element 2, and more specifically to the decorative band 24 already applied to the periphery of the interior face 21 so that this baseplate 5 is not visible from outside the vehicle.

For rigidly fixing the projecting element 4 to the opening, the threaded part 40 is inserted into a hole formed in the upright 3 and, more specifically here, into a double rebate 3, 3'. A trim 8 is then positioned over the double rebate to conceal it from view from the inside, then a bolt 9 is screwed onto the threaded part 40.

As can be seen by comparing FIGS. 2 and 3, the projecting element 4 is a rigid fixing means for rigidly fixing the projecting element to the upright 3 of the opening, such that the orientation of the axis A with respect to the upright 3 is unchanged during the opening or closing movement of said glazed element 2.

By contrast, as can be seen by comparing FIGS. 2 and 3, the baseplate 5 is a flexible fixing means for flexibly fixing the projecting element to the upright 3 of said opening.

Since the baseplate 5 is bonded to the interior face 21, when the glazing is opened (transition from FIG. 2 to FIG. 3), the baseplate 5 follows the pivoting movement of the glazed element 2 about the axis R by deforming in the connecting part 7 such that the orientation of the glazed element 2 with respect to the axis A is changed during the opening or closing movement of said glazed element 2.

Thus, if, in the closed position, the glazed element 2 (in this instance its exterior face 23 for simplicity) is at an angle δ, for example of 90°, with respect to the axis A of the projecting element 4 at the point where the axis A passes through the exterior face 23, then when the glazed element 2 is in the open position (FIG. 3) the angle δ' between the exterior face 23 and the axis A at the point where the axis A passes through the exterior face 23 is: δ-α; namely for example 85° or 83° according to whether the angle of opening α is for example 5° or 7° respectively.

As can be seen in FIG. 3, the axis of rotation R is situated in the hollow of the bent connecting part 7.

The baseplate 5 is therefore fixed elastically to the projecting element 4 so that its orientation with respect to said projecting element 4 is changed during the opening or closing movement of said glazed element 2.

Figure 4:
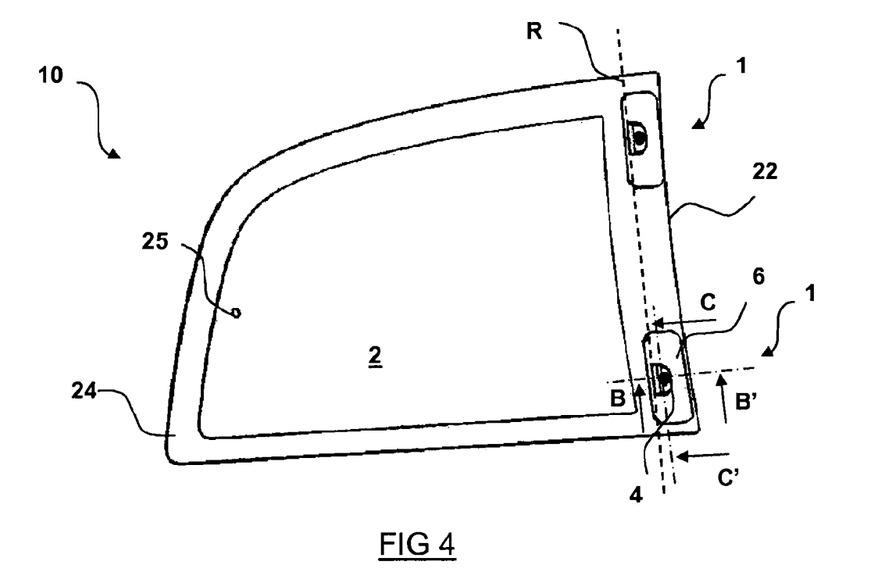
FIG. 4 illustrates a view of the interior face of a vehicle glazing according to the invention comprising two examples of fixing devices which are identical for fixing a glazed element according to the invention.

The present invention relates to glazing 10, notably to vehicle glazing like that visible in FIG. 4, for fixing a glazed element 2 into an opening (not visible in FIG. 4) so that this glazed element 2 can be pivoted with respect to this opening about an axis of rotation R through a small angle of opening α, which means one between >0° and ≤10°, such as 5° or 7° for example.

The glazing 10 according to the invention is identical to the glazing 10' illustrated in FIG. 1 except that it comprises two fixing devices 1 which are both identical, but which are different than fixing devices 1' of FIGS. 1 to 3. The technical elements of the glazing 10' of the prior art which can be considered again in exactly the same way for the glazing 1 according to the invention comprise the same reference throughout the present document. In particular, the glazed element 2, the upright 3, the projecting element 4 and the baseplate 5 may be identical.

Figure 5:
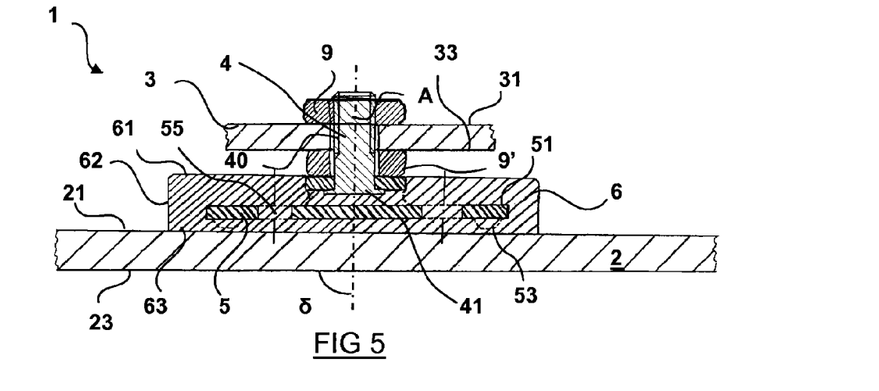
FIG. 5 is a view in section on CC' of FIG. 4 of a fixing device for fixing a glazed element according to a first alternative form of embodiment of the invention, also partially showing the opening with respect to which the glazing can move, the glazing being in the closed position.

Like the fixing devices 1', each fixing device 1 according to the invention comprises, as visible in FIG. 5:
- on the one hand at least one projecting element 4 having an axis A for fixing the device 1 to an upright 3 of said opening, and
- on the other hand at least one baseplate 5 having an interior face 51 and an exterior face 53 which is situated facing the interior surface 21 of the glazed element 2.

By contrast, unlike the fixing devices 1', the baseplate 5 of each fixing device 1 is not bonded to the interior face 21; said baseplate 5 is fully integrated into a portion of elastic material 6 which itself adheres at least to the interior face 21 of the glazed element 2.

The portion of elastic material 6 thus has an interior face 61 which is intended to face the interior of the vehicle, and a lateral face 62 and an exterior face 63 which is intended to face toward the outside of the vehicle.

The polymer material of which the portion of elastic material 6 is made may be thermoplastic (PVC, TPE, TPU, etc.), a thermoset (RIM polyurethane) or even a synthetic rubber of EPDM type, or any other suitable material.

It is possible to plan to prime the glazed element 2 prior to encapsulation.

According to the invention, the portion of elastic material 6, which is situated at least between said interior face 21 of the glazed element 2 and the exterior face 53 of the baseplate 5, is not a layer of adhesive.

The elastic material of the portion of elastic material 6 preferably has a Young's modulus at 20° C. of between 5 MPa and 75 MPa, end-points inclusive.

The elastic material of the portion of elastic material 6 preferably has a Young's modulus at 100° C. of between 3 MPa and 50 MPa, end-points inclusive.

It is the Young's modulus at the service temperature (which for the purposes of simplicity means the modulus at 20° C.) that determines the elasticity for the opening and closing of the device according to the invention.

Advantageously, the fact that the Young's modulus at 100° C. of the elastic material of the portion of elastic material 6 is similar (being different by less than 20 MPa), or even identical, to the Young's modulus at 20° C. of this material ensures that the effort needed to open the glazed element will be roughly the same whatever the temperature outside the vehicle.

The portion of elastic material 6 is manufactured using a manufacturing method known as "encapsulation" because it involves a step of molding the portion of elastic material 6 in a molding device, between two molding elements, one molding element accommodating the interior face of the glazing and one molding element accommodating the exterior face of the glazing, these two molding elements being closed together during the molding step while at the same time forming between them a molding cavity which is filled with the material that makes up the portion of elastic material 6 during the step of molding this portion.

A comparison of FIG. 4 against FIG. 1 shows that the portions of plastic material 6 of the fixing devices 1 according to the invention have to occupy a greater volume on the interior face of the glazed element than the baseplates of the fixing devices 1' of the prior art, because each portion of plastic material 6 is longer and wider than the baseplate 5 it integrates.

The two portions of elastic material 6 of the two devices 1 of FIG. 4 are preferably encapsulated at the same time. As can be seen in this figure, the two portions of elastic material 6 are separated from one another, but it is equally possible to produce just one portion of plastic material, integrating the two baseplates 5 of the two devices 1.

The projecting element 4 here is a nut having a threaded part 40 and a head 41 wider than the threaded part. For rigidly fixing the projecting element 4 to the opening, the threaded part 40 is introduced into a hole formed in the upright 3, then a bolt 9 is screwed onto the threaded part 40.

The head 41 is welded to the baseplate 5 or is formed as an integral part of said baseplate 5 or passes through the baseplate 5 (which in the latter case means is situated on the other side of the baseplate from the threaded part). The head 41 is thus preferably at least partially, or even fully, integrated into said portion of elastic material 6. The threaded part 40 is thus preferably entirely outside the portion of elastic material 6, to make molding easier.

As an alternative, the threaded part 40 could be a clip.

The material of the baseplate 5 (or even of the entire fixing device 1) may be:
- a stainless steel, or
- a steel that has been treated against corrosion (although not necessarily using cataphoresis, for example by an earlier zinc coating), or
- a plastic reinforced with a filler, such as a glass-fiber-reinforced polyamide (e.g.: PA66FV).

According to the invention, the projecting element 4 is a rigid fixing means for rigidly fixing the projecting element to the upright 3 of said opening, so that the orientation of the axis A with respect to the upright 3 remains unchanged during the opening or closing movement of said glazed element 2 and so that during the opening movement of said glazed element 2 at least one, or even several, part(s) P, P' of said portion of elastic material 6 is (are) squashed between said baseplate 5 and said upright 3 and/or said baseplate 5 and said glazed element 2. This elastic material is, incidentally, relaxed upon the closing movement.

In the kinematic system according to the invention it is possible to interpose a rigid shim in contact with the upright 3 and/or in contact with the baseplate 5 and/or in contact with the glazed element 2; the important thing is to ensure that the portion of elastic material 6 becomes squashed during opening and relaxes during closing.

In order to obtain the squashing/relaxation effect on opening/closing, the elastic material 6 is chosen for example to be made of TPE: C85A HPM, available from BASF. It has a Young's modulus at 20° C. of 20 MPa and a Young's modulus at 100° C. of 4 MPa.

The baseplate 5 may have at least one hole 55 opening onto its interior face 51 and onto its exterior face 53 and filled with the material of said portion of elastic material 6 in order to increase the integrity of the mechanical bond between the elastic material 6 and the baseplate 5.

The baseplate 5 may further comprise at least one anchor tab 56, and notably four anchor tabs 56, positioned in said portion of elastic material 6 in order further to improve the integrity of the mechanical connection between the elastic material 6 and the baseplate 5.

It is preferable for the baseplate 5 not to be in contact with a face of the glazed element in order to avoid any risk of this element breaking, particularly when the baseplate is made of metal or metal alloy. The anchor tab(s) 56 may be in contact with a face of the glazed element, but it is then preferable for it (them) to be configured with a part turned back toward the inside in order to avoid any risk of breakage of the glazed element, particularly when the anchor tab(s) is (are) made of metal or metal alloy.

As illustrated in FIGS. 4 to 7, the projecting element and the baseplate are connected/attached to one another in the same way as in the prior art shown in FIGS. 1 to 3. For that, the fixing device 1 comprises a connecting part 7 bent at 180° and mechanically connecting the projecting element 4 to the baseplate 5, the end of the connecting part 7 being pierced to retain the head 41 of the projecting element 4.

The baseplate 5 is integrated into the portion of elastic material 6 on the interior face 21 of the glazed element 2, and more specifically on the decorative band 24 applied beforehand at the periphery of the interior face 21 so that this portion of elastic material 6 is not visible from outside the vehicle.

The portion of elastic material 6 protects, by covering them, the entirety of the baseplate 5 with the connecting part 7. It improves the mechanical integrity of the fixing as a whole.

Figure 6:
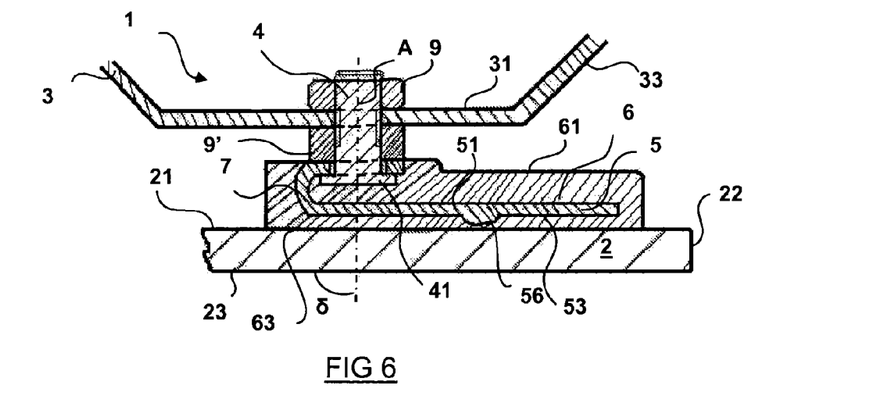
FIG. 6 is a view in section on BB' of FIG. 4, also partially showing the opening with respect to which the glazing can move, the glazing being in a closed position.

As can be seen in FIGS. 5 and 6, only the innermost face of the bent part 7 of the baseplate 5 lies flush with the surface of the interior face 61 of the portion of elastic material 6, but this face is then positioned against a washer 9' interposed between the upright 3 and the head 41 of the projecting element 4 so that this face is likewise protected against external chemical attack.

This washer 9' is optional; the innermost face of the bent part 7 of the baseplate 5 can thus be positioned directly against the upright 3. This washer 9' may be rigid or flexible; if it is flexible, its flexibility contributes toward the elasticity that allows the portion of elastic material 6 to be squashed between the upright 3 and the baseplate 5.

Figure 7:
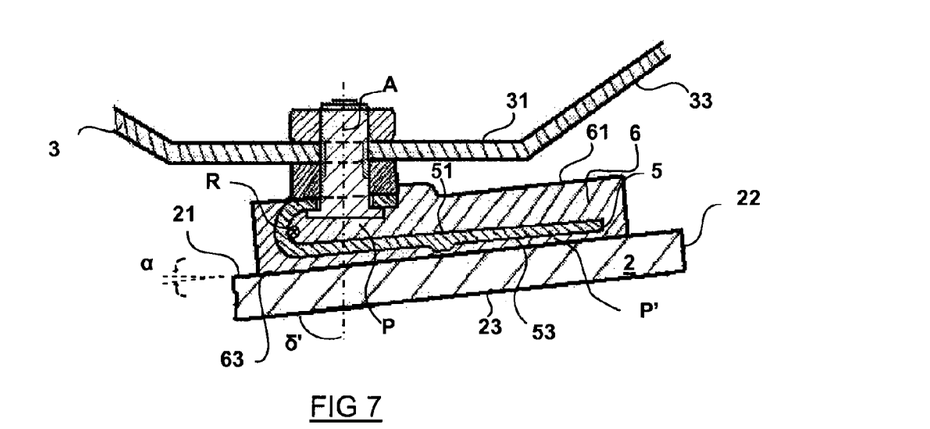
FIG. 7 is a view in section on BB' of FIG. 4, also partially showing the opening with respect to which the glazing can move, the glazing being open by an angle α.

As can be seen by comparing FIGS. 6 and 7, the projecting element 4 is a rigid fixing means for rigidly fixing the projecting element to the upright 3 of the opening so that the orientation of the axis A with respect to the upright 3 remains unchanged during the opening or closing movement of said glazed element 2.

As may by seen by comparing FIGS. 6 and 7, the baseplate 5 is a flexible fixing means for flexibly fixing the projecting element to the upright 3 of said opening: the baseplate 5 is elastically fixed to the projecting element 4 so that its orientation with respect to said projecting element 4 is changed during the opening or closing movement of said glazed element 2, but most of the elasticity in the movement of the glazed element 2 with respect to the upright 3 comes from the elastic material 6.

Specifically, unlike the case of the prior art illustrated in FIGS. 1 to 3, the flexibility of the baseplate 5 of the first alternative form plays little part in controlling the pivoting of the glazing.

During the opening movement of the glazed element 2, on the one hand a part P of the portion of elastic material 6 is squashed between the baseplate 5 and the upright 3 (and more specifically between the baseplate 5 and the washer 9' when the washer is chosen to be rigid) and on the other hand a part P' of the portion of elastic material 6 is squashed between the baseplate 5 and the interior face 21 of the glazed element 2 even though, in practice, the squashing of part P' is small and not readily noticeable.

Thus, on opening the glazing (transition from FIG. 6 to FIG. 7), the baseplate 5 follows the pivoting movement of the glazed element 2 with respect to the axis R by deforming in the connecting part 7, so that the orientation of the glazed element 2 with respect to the axis A is changed during the opening or closing movement of said glazed element 2, but above all, the portion of elastic material 6 deforms:

Thus, if, in the closed position, the glazed element 2 (here its exterior face 23 for simplification) makes an angle δ, for example 90°, with respect to the axis A of the projecting element 4 at the point where the axis A passes through the exterior face 23, then when the glazed element 2 is in the open position (FIG. 7), the angle δ' between the exterior face 23 and the axis A at the point where the axis A passes through the exterior face 23 is: δ-α; namely 85° or 83° for example, depending on whether the angle of opening α is for example 5° or 7° respectively.

If the angle δ in FIG. 6 is not 90°, then the angle referenced δ in FIG. 5 will be different.

As can be seen in FIG. 7, the axis of rotation R is situated in the hollow of the bent connecting part 7.

Fatigue testing has demonstrated that the connection achieved with the portions of elastic material 6 is extremely reliable over the course of use; it is more reliable than the solution of the prior art illustrated in FIGS. 1 to 3.

The invention claimed is:

1. A device for fixing a glazed element into an opening for the glazed element to be able to be pivoted with respect to the opening about an axis of rotation through an angle of opening, the device comprising:

at least one projecting element including an axis for fixing the device to an upright of the opening; and at least one baseplate including an interior face and an exterior face which is situated facing a surface of the glazed element, and an entirety of the baseplate being fully integrated into a portion of elastic material adhering at least to the interior face of the glazed element, wherein the projecting element includes a rigid fixing means for rigidly fixing the projecting element to the upright of the opening so that an orientation of the axis of the projecting element with respect to the upright remains unchanged during an opening or closing movement of the glazed element and so that during the opening movement of the glazed element, at least one part of the portion of elastic material is squashed between the baseplate and the upright or between the baseplate and the glazed element, the baseplate being fixed elastically to the projecting element so that an orientation of the baseplate with respect to the axis of the projecting element is changed during the opening or closing movement of the glazed element.

2. The device as claimed in claim 1, further comprising a bent connecting part mechanically connecting the projecting element to the baseplate.

3. The device as claimed in claim 1, wherein the elastic material of the portion of elastic material has a Young's modulus at 20° C. of between 5 MPa and 75 MPa, end-points inclusive.

4. The device as claimed in claim 1, wherein the elastic material of the portion of elastic material has a Young's modulus at 100° C. of between 3 MPa and 50 MPa, end-points inclusive.

5. The device as claimed in claim 1, wherein the projecting element includes a bolt including a threaded part and a head which passes through the baseplate, the head being at least partially into the portion of the elastic material.

6. The device as claimed in claim 1, wherein the baseplate comprises at least one hole opening onto an interior face of the baseplate and onto an exterior face of the baseplate and filled with the material of the portion of the elastic material.

7. The device as claimed in claim 1, wherein the baseplate comprises at least one anchor tab, or four anchor tabs, positioned in the portion of the elastic material.

8. The device as claimed in claim 1, wherein the projecting element includes a bolt including a threaded part and a head which is welded to the baseplate or formed as an integral part of the baseplate, the head being at least partially integrated into the portion of the elastic material.

9. A glazing comprising the glazed element and at least one, or two, devices as claimed in claim 1, for fixing the glazed element into the opening.

10. A method of manufacturing a glazing comprising the glazed element and at least one device as claimed in claim 1 for fixing the glazed element into the opening, the device comprises the baseplate which is at least partially, or fully, overmolded in a portion of the elastic material that adheres at least to the interior face of the glazed element.

* * * * *